US005487078A

United States Patent [19]
Rhodes et al.

[11] Patent Number: 5,487,078
[45] Date of Patent: Jan. 23, 1996

[54] APPARATUS AND METHOD FOR GENERATING PROMPT X-RADIATION FROM GAS CLUSTERS

[75] Inventors: Charles K. Rhodes, Chicago, Ill.; Keith Boyer, Los Alamos, N.M.

[73] Assignee: Board of Trustees of the University of Illinois, Urbana, Ill.

[21] Appl. No.: 213,601

[22] Filed: Mar. 14, 1994

[51] Int. Cl.$^6$ ............................................. H01S 3/30
[52] U.S. Cl. .................................. 372/5; 372/39; 372/69
[58] Field of Search ................................. 372/5, 39, 41, 372/69

[56] References Cited

U.S. PATENT DOCUMENTS

| | | | |
|---|---|---|---|
| 4,592,064 | 5/1986 | Silvast | 372/5 |
| 4,875,213 | 10/1989 | Lo | 372/5 |
| 4,887,273 | 12/1989 | Komatsubara et al. | 372/41 |

Primary Examiner—Leon Scott, Jr.
Attorney, Agent, or Firm—Samuel M. Freund

[57] ABSTRACT

Apparatus and method for generating prompt X-radiation from gas clusters. The present invention includes the excitation of inner-shell electrons in the atoms comprising gas clusters using intense ultraviolet laser radiation, thereby producing intense, prompt X-ray emission from the ensemble. Clusters enable atomic excitation rates to achieve the high values characteristic of condensed matter while simultaneously eliminating, through local rapid expansion to low particle density, undesirable collisional interactions that would establish equilibrium conditions in the excited material, and effectively destroy the inner-shell specificity of the excitation. By choosing the atomic species in the cluster, the laser intensity and wavelength, and the cluster size, one can determine the wavelength of X-radiation emitted from the clusters. Moreover, by selecting the energy levels involved in the excitation process, one can produce a population inversion having significant gain and suitable for lasing.

22 Claims, 6 Drawing Sheets

APPARATUS AND METHOD FOR GENERATING PROMPT X-RADIATION FROM GAS CLUSTERS

BACKGROUND OF THE INVENTION

The present invention relates generally to generation of X-rays, and more particularly to the multiphoton-induced production of prompt X-radiation from gas clusters. The invention was made with U.S. Government support under contracts with the University of Illinois at Chicago. The Government has certain rights in the invention.

Intense $Kr^{9+}$ ($4p \rightarrow 3d$) emission at about 100 Å has been observed from the exposure of pulsed-gas targets to high-intensity ultraviolet radiation. See, e.g., "Studies Of Multiphoton Production Of Vacuum-Ultraviolet Radiation In The Rare Gases," by A. McPherson et al., J. Opt. Soc. Am. B 4, 595 (1987). Measurements of ion production in tenuous gas targets conducted under identical conditions of irradiation, had demonstrated that no production of $Kr^{9+}$ was possible from free Kr atoms at this radiation intensity. See, e.g., "Tunneling Ionization In The Multiphoton Regime," by G. Gibson et al., Phys. Rev. A 41, 5049 (1990). An identical anomaly has also been observed in studies of the 165 Å emission from $Ar^{9+}$. The identification of these emissions, produced either by a prompt or a delayed mechanism, were anomalous.

Estimates concerning limiting cross sections for multiphoton coupling to free atoms have been described in "Limiting Cross Sections For Multiphoton Coupling," by K. Boyer et al., Revue Phys. Appl. 22, 1793 (1987). Therein, effective cross sections for energy transfer in the high intensity limit ($\geq 10^{19}$ W/cm$^2$) for heavy metals were evaluated. A prediction that energy transfer in the range between 0.1–1.0 W/atom was feasible with an intensity of irradiation between $10^{19}$ and $10^{20}$ W/cm$^2$ emerged from this study. Such enormous values for the rate of energy transfer are comparable to those developed during subpicosecond irradiation of solid surfaces at high intensities, although it would be difficult to imagine conditions where such would occur in free atoms. In fact, X-ray emission from free rare gas atoms (e.g., Ar, Kr, and Xe) has been experimentally found to be negligible for intensities $\leq 10^{17}$ W/cm$^2$ in "Search For Multiphoton-Induced Inner-Shell Excitation," by P.H.Y. Lee et al., Phys. Rev. A 40, 1363 (1989), while, by contrast, in "High Intensity Generation of 9–13 Å X-Rays From $BaF_2$ Targets," by A. Zigler et al., Appl. Phys. Lett. 59, 777 (1991), the authors observed copious amounts of kilovolt radiation from M-shell transitions of Ba ions in the dense, highly-excited plasma formed on the surface of solid $BaF_2$ irradiated at a comparable intensity (about $10^{17}$ W/cm$^2$).

In "Studies Of Multiphoton Production Of Vacuum-Ultraviolet Radiation In The Rare Gases," by A. McPherson et al., J. Opt. Soc. Am. B 4, 595 (1987), the authors discuss the reasons, later to be proven incorrect, that fluorescence from laser-excited rare gases is unaffected by clustering of these target gases emerging from a pulsed gas jet. Although fluorescence was observed using two different excitation pulse shapes, one of which would have been expected to produce a significant change in fluorescence distribution and quantity from clustered atoms, the patterns of fluorescence observed were essentially identical. The authors stated that experimental evidence did not lead to a conclusion that clustering of the rare gases played an important role in their observations.

In a very recent work entitled "X-Ray Generation From Nd Laser-Irradiated Gas Puff Targets," by Henryk Fiedorowicz et al., the authors describe the generation of high-intensity soft X-radiation from Nd laser-irradiated Kr or $SF_6$ which is pulse injected into a vacuum chamber. Such X-ray sources have certain advantages over laser plasma x-ray sources using solid targets, in that target conditions are easily reproduced for high-repetition-rate applications, and there is little target debris. A Nd-glass laser was employed which generated 1-ns pulses having up to 15 J of energy. The irradiation was performed parallel to the gas flow. The authors believe that the laser radiation interacts with the aerosol created as a result of condensation of the gas flowing through the nozzle to produce unexpectedly high quantities of X-radiation. Moreover, it is stated that the soft x-ray emission has a much longer duration than that produced by direct emission processes. This suggests that the observed emission is a purely thermal process in which the electrons reach a sufficiently high temperature to strip the atoms down to the ionization state which can then emit the observed X-ray spectrum from recombination after cooling.

By contrast, it is one object of the present invention to provide an apparatus and method for generating intense prompt X-radiation.

Another object of our invention is to provide an apparatus and method for generating amplified X-radiation in which inner shell vacancies are produced by efficient non-thermal processes.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the method for generating prompt X-radiation includes the steps of generating pulsed laser radiation having a chosen intensity and wavelength, generating gaseous atomic clusters having a chosen density and size, and directing the laser radiation into the gas clusters, whereby multiphoton coupling with the clusters occurs producing rapid atomic excitation by non-thermal processes, thereby removing selected inner-shell atomic electrons without removing all of the electrons in the next outermost shell.

Preferably, by selecting the intensity and wavelength of the incident radiation, the atomic species in the clusters, and the size of the clusters X-radiation having a chosen wavelength can be generated.

It is also preferred that by selecting the atomic transitions involved, a population inversion can be established therein suitable for lasting.

In a further aspect of the present invention, in accordance with its objects and purposes, the apparatus hereof includes means for generating pulsed laser radiation having a chosen intensity and wavelength, means for generating gaseous atomic clusters having a chosen density and size, and means for directing the laser radiation into the gas clusters, whereby multiphoton coupling with the clusters occurs producing rapid atomic excitation, thereby removing selected inner-shell atomic electrons without removing all of the electrons in the next outermost shell.

Preferably, by selecting the intensity and wavelength of the incident radiation, the atomic species in the clusters, and the size of the clusters X-radiation having a chosen wavelength can be generated.

It is also preferred that by selecting the atomic transitions involved, a population inversion can be established therein suitable for lasing.

Benefits and advantages of our invention include the generation of prompt, intense, X-radiation having a chosen wavelength. Moreover, by selecting the energy levels involved, one can produce a population inversion having significant gain suitable for lasing.

BRIEF DESCRIPTION OF THE DRAWINGS

The accompanying drawings, which are incorporated in and form a part of the specification, illustrate two embodiments of the present invention and, together with the description, serve to explain the principles of the invention. In the drawings.

DETAILED DESCRIPTION OF THE PREFERRED EMBODIMENTS OF THE INVENTION

Figure 1A:
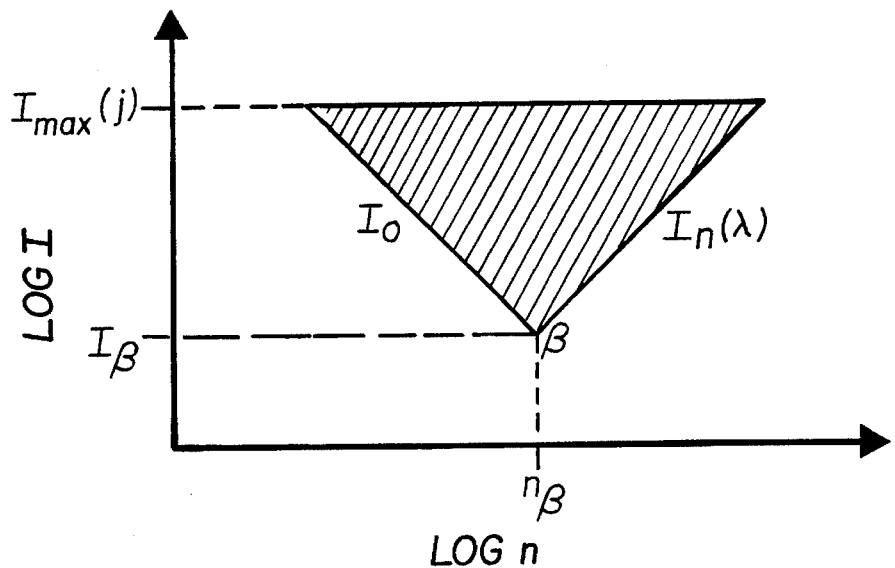
FIG. 1a is a schematic representation of the allowed zone for prompt j-shell emission from a homonuclear cluster as a function of intensity (I) and cluster size (n).

Briefly, the present invention includes the excitation of inner-shell electrons in the atoms comprising gas clusters using intense ultraviolet laser radiation, thereby producing intense, prompt X-ray emission from the ensemble. A gas of these clusters responds as a solid whose average density can be independently controlled. Important implications for amplification of X-rays derive from the observed specificity of the inner-shell excitation, and the ability to simultaneously combine the advantageous properties of both high and low density in the dynamics of the medium; that is, the excitation rate is extremely high, while the relaxation pathways to equilibrium are effectively blocked. Once ionization occurs, coulomb forces rapidly separate the atoms in the highly ionized molecules (clusters), converting the system into an ionic gas with relatively low average particle density having an unusually elevated energy density, thereby preventing cooling with subsequent electron recombination. The outcome is that strong amplification ($>10^2$ cm$^{-1}$) is predicted in the 5–100 Å range for irradiated clusters containing heavy atoms.

It is known that in experiments using pulsed-gas jet sources that some clusters of atoms, resulting from expansion cooling and condensation of the gas, are present. In "Atomic Inner-Shell Excitation Induced By Coherent Motion Of Outer-Shell Electrons," by K. Boyer and C.K. Rhodes, Phys. Rev. Letters 54, 1490 (1985), it was proposed that inner-shell vacancies could be produced by collisions with outer-shell electrons during their quiver motion when driven by an intense optical field. While this mechanism was found not be effective for free atoms due to electron ejection from the atom or to constraints placed on the motions of outer-shell electrons therein, the present inventors more recently concluded that such processes should be effective for free electrons produced in clusters of atoms by field ionization. The gas clusters provide a number of advantages over the free atoms. For a cluster with n atoms, there are n times the number of electrons making collisions, n times the number of targets, and approximately $n^{1/3}$ times the energy available per collision, since the quiver amplitude is many times the size of the atomic diameter. Additionally, since the free electrons are driven coherently, the excitation energy can be contributed to by all the electrons as though the collision was being made by a quasi-particle having a mass and energy of the n participating electrons. This leads to the lower intensity and larger cross sections observed in the Examples set forth hereinbelow.

If one considers a spherical cluster of n identical atoms, the production of short wavelength radiation from clusters requires that certain conditions be met. These requirements establish relationships between intensity of irradiation and the cluster size, n, which define allowed zones for emission to occur. Sufficient kinetic energy must be imparted to the electrons removed from the atoms by the interaction of the clusters with the intense incident radiation in order to excite an inner electron. The electric field (E) produced when coherent electromagnetic radiation is incident on matter is proportional to the square root of the intensity of the radiation, thus producing large electric fields throughout the clusters. That is, since cluster size may be chosen to be well within the skin depth of a solid of the same material, the electric field penetrates the cluster, and is experienced equally, simultaneously by all the atoms in the cluster. Ionization of outer shell electrons occurs initially under the influence of the enormous electric fields generated by the incident laser. These free electrons are then accelerated by the field and the intra-cluster process of the form

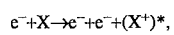

or

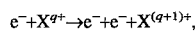

which has a cross section $\sigma_{ei}$, and can lead to the excitation of inner-shell electrons and prompt X-ray emission. This concept represents the cluster/molecule analog of an interaction previously proposed by the present inventors for multiphoton excitation of free atoms.

An estimate of the number $N_x$ of such excitations or ionizations can be written as the product of the number of electrons produced in the cluster, nZ, the atomic density in the cluster, $r_0-3$, the cross section for the inelastic channel under consideration, σei, and the characteristic scale length of the cluster, R, as $$N_x = (nZ)\sigma_{ei} r_0^{-3} r_0 n^{1/3} = n^{4/3} Z \sigma_{ei}/r_0^2,$$

for n≧3. One observes that the pattern of ionization depends upon the cluster size, n, thereby yielding an observed spectrum of ionic charge which is different from that characteristic of the free atom (n=1).

The requirement that electron collisions have the minimum energy ($\epsilon_e$) needed for inner-shell excitation leads to the specification of two limiting intensities $I_0$ and $I_n(\lambda)$, where $$I_0 = \epsilon_e^2/8\pi\alpha n^{2/3}\hbar r_0^2,$$

and $$I_n(\lambda) = (2\pi^3/\alpha)(r_0/\lambda)^2(mc^2)(c \not{\lambda}_c)(n^{2/3}/\lambda^2),$$

both for n≧3, where $\alpha = e^2/\hbar c$, m is the electron mass, λ is the wavelength of the optical field, and $\not{\lambda}c$ is the Compton wavelength for an electron.

$I_0$ produces the acceleration of a free electron through the cluster over the characteristic dimension (R) thereof in a time comparable to or less than a period of the wave (after which the electric field will reverse direction) according to $\epsilon_e = eER$. As the cluster size increases, the requisite intensity drops since the accelerated electrons experience a larger fraction of the available electric field, but still interact with inner-shell electrons before leaving the cluster. However, as the electric field reverses each cycle, the electron can again interact with the cluster until it makes a collision or leaves the cluster. The other limiting intensity, $I_n(\lambda)$ reflects the possibility that the range of the oscillating electron is less than the cluster radius, since this range is proportional to the electric field and hence the square root of the intensity. This can impose a different, wavelength-dependent, lower limit on the intensity, $I_n(\lambda)$, to ensure the cluster radius is not too large for the available intensity. The optimum situation for a given excitation energy is achieved when the range of the electron exactly matches the radius of the cluster. Thus, an inner-shell electron with binding energy $\epsilon_e$ can be ejected if the intensity exceeds a lower bound given by either $I_0$ or $I_n(\lambda)$, whichever is greater.

A further reduction in the required intensity results from the following mechanisms. There are two ionization processes operating. The first process is the field ionization, illustrated in FIG. 5 hereof, which produces the initial free electron population. The second process is a collisional process in which the free electrons driven by the optical field make energetic collisions with bound electrons and eject those which are not too strongly bound. However, since the free electrons are driven coherently, by the optical field, they can combine their energy in the collision with the bound electron, thus acting as a quasi-particle with n times the mass and energy of a single electron. This effect further reduces the required intensity by a large factor.

Excitation of the type described above leads to the emission of prompt inner (j−1)-shell radiation in the x-ray range. Generally, in addition to the production of a hole in the (j−1)-shell, the possibility of prompt j→j−1 transitions requires retention of at least one electron in the j-shell during the course of irradiation. This determines an upper bound on the intensity, which, with the use of the tunneling ionization model set forth in "Tunneling Ionization of Noble Gases In A High-Intensity Laser Field," by S. Augst et al., Phys. Rev. Lett. 63, 2212 (1989), leads to a limiting intensity $I_{max(j)}$ which is independent of the cluster size. Hence, as presently understood by the inventors, the allowed zone for prompt X-ray emission from atoms of a homonuclear cluster appears generally as a triangular region in a plot of the intensity of irradiation versus the cluster size.

In summary, then, it has been found that because inner-shell excitation cross sections, $\sigma_{ei}$, are favorable, by selecting the irradiation wavelength and intensity, and the cluster size, selected inner-shell electrons may be ejected from atoms, with the number of such excitations being $N_x$, without the removal of all of the lower-energy outer electrons. This leads immediately to a population inversion, with consequent prompt X-ray emission at wavelengths depending upon the particular atomic system, and the intensity.

Reference will now be made in detail to the present preferred embodiments of the invention, examples of which are illustrated in the accompanying drawings. All similar or identical structure will be identified using the same callout numbers.

Turning now to FIG. 1a, a general representation of the allowed zone for prompt j-shell emission from a homonuclear cluster as a function of intensity (I) and cluster size (n) is illustrated. If the optimization of the system is identified with (1) the utilization of the lowest possible intensity, and (2) excitation of the cluster under conditions of maximal amplification per unit density then vertex β defines that optimum. It can be shown that $$n_\beta^{4/3} = (\lambda_x/2\pi r_0)^4(\epsilon_e/mc^2)^2,$$

which gives an explicit value for the optimum cluster size.

Figure 1B:
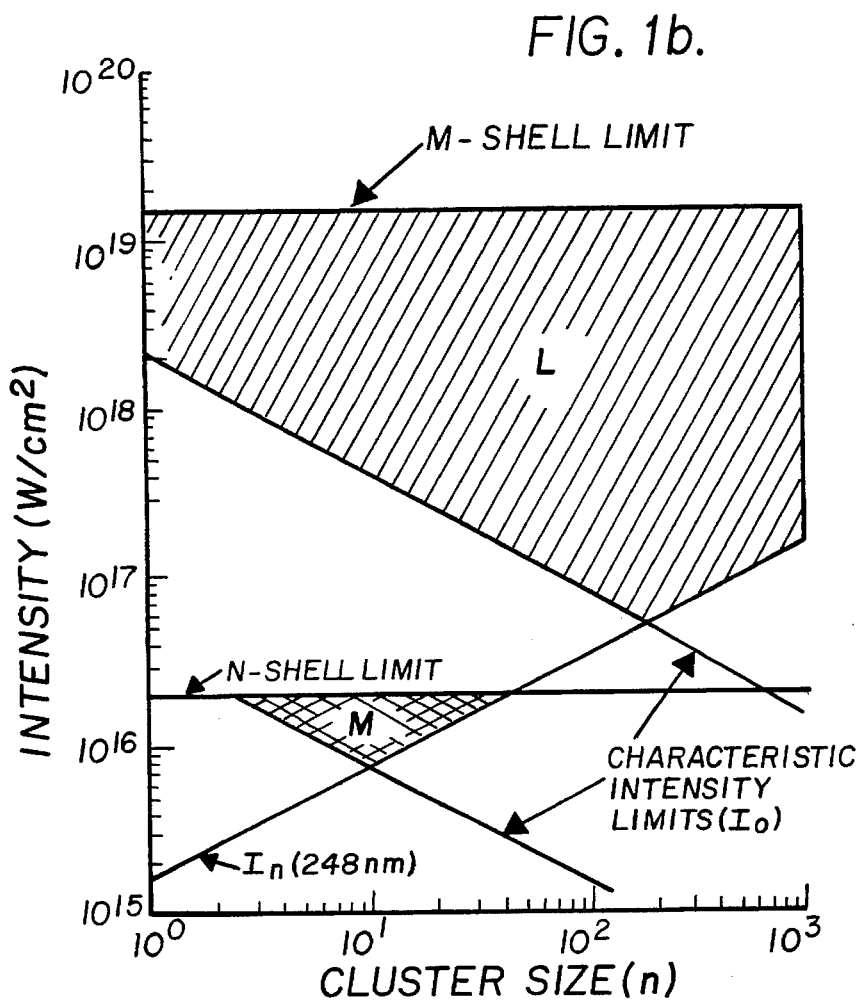
FIG. 1b illustrates these features for two types of transitions in krypton; the M-shell transitions in $Kr^{9+}$ (at about 100 Å) for laser intensities of about $10^{16}$ W/cm$^2$, and the L-shell emissions in $Kr^{26+}$ (between 5 and 7.5 Å) for laser intensities of about $10^{18}$ W/cm$^2$.

FIG. 1b illustrates these features for two types of transitions in krypton; the M-shell transitions in Kr9+(at about 100 Å) for laser intensities of about 1016 W/cm², and the L-shell emissions in Kr26+ (between 5 and 7.5 Å) for laser intensities of about 1018 W/cm², as will be explained in more detail hereinbelow.

Having generally described the present invention, the following examples illustrate the invention in greater detail.

EXAMPLE 1

In accordance with the description set forth above, an increase in the cluster density and average cluster size should lead to both a corresponding intensification and a spectral modification of the detected emission over that for single atoms. This will be illustrated in some detail for krypton, with other rare gases being mentioned to illustrate that x-ray wavelengths generated in the practice of the present invention may be selected by choosing the atomic system and the intensity of incident radiation.

Pulse-gas jet sources have been used in the past for studying the effects of high-intensity pulsed laser radiation on gas targets in order to enable a fresh gas target to be exposed to each incident laser radiation pulse. As stated above, researchers had observed anomalous Kr9+ emissions in what was believed to be free Kr atoms. It is well known that rare gas cluster formation can be substantially increased by cooling the flow in the nozzle of the pulsed-jet source. Comparison of krypton spectra observed at comparable stagnation pressures and two different temperatures would then be expected to demonstrate the importance of the role of cluster species in the production of radiating ions.

Figure 2:
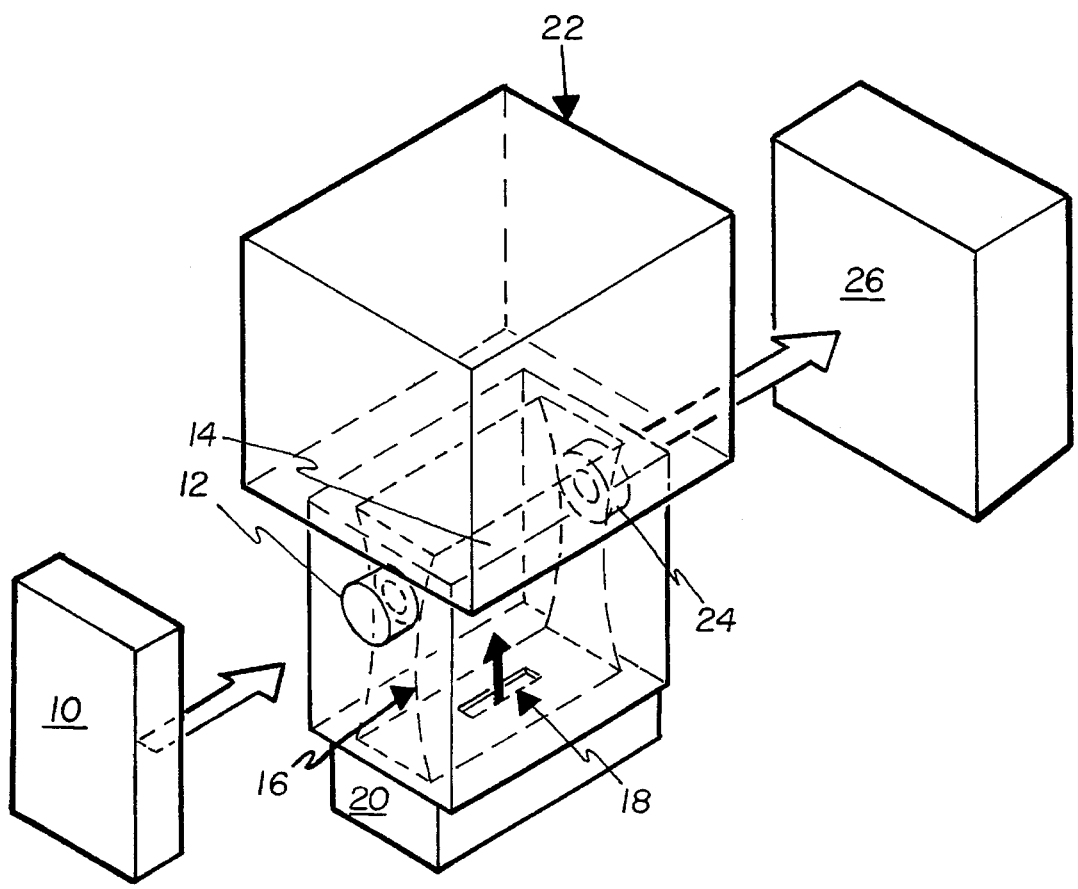
FIG. 2 illustrates the apparatus used to generate and observe the X-ray emission from clusters, and one likely to be utilized for producing X-ray laser radiation.

The pulsed gas jet used in the present experiments is described in detail in "Studies of Multiphoton Production of Vacuum-Ultraviolet Radiation In The Rare Gases, supra, and the 248 nm laser employed is described in "High-Brightness Subpicosecond Terawatt KrF* System Driven With A Frequency-Converted Self-Mode-Locked Pulse-Compressed Ti:Al$_2$O$_3$ Laser," by B. Bouma et al., J. Opt. Soc. Am. B 10, 1180 (1993), the disclosures of which references are hereby incorporated by reference herein. FIG. 2 illustrates the apparatus used to generate and observe the x-ray emission from clusters, and one likely to be utilized for producing x-ray laser radiation. Pulsed, KrF* 248 nm radiation (pulse width of about 300 fs, and a power of about 0.7 TW) generated from laser source 10 is directed through CaF$_2$ window 12 into the free-flow region of throat 14 of elongated nozzle 16. In the actual nozzle employed, the throat was ~500 μm across, while the free-flow region was ~1000 μm across. Gas pulses, introduced into nozzle 16 through pulsed gas jet 18 from gas source 20, were trapped by cryogenic trap 22 after expansion through the nozzle. Trap 22 was cooled using free-flowing dry nitrogen which had been passed through a liquid nitrogen bath. A thermocouple attached to the valve body was used to monitor the temperature of the gas directly behind the jet. Emitted X-radiation in the direction of the incident 248 nm radiation passes through beryllium output window 24 to spectrometer 26. The gas jet was mounted approximately 12 cm in front of the entrance slit of a 2.2-m grazing-incidence spectrometer, 26, equipped with a 600-line/mm gold-coated spherical grating blazed at 120 nm. A single-stage microchannel plate with a phosphored fiber-optic anode serves as a detector. The FWHM resolution and accuracy of the spectrometer-detector system were typically 0.1 nm in the x-ray region observed. Pulsed-gas valve 18 was designed to withstand backing pressures of up to 5.17×10$^4$ Torr (1000 psi), with a pulse repetition rate of 2 Hz. Pressures in the free-flow region of the nozzle are typically 10$^{+3}$ Torr.

Figure 3A:
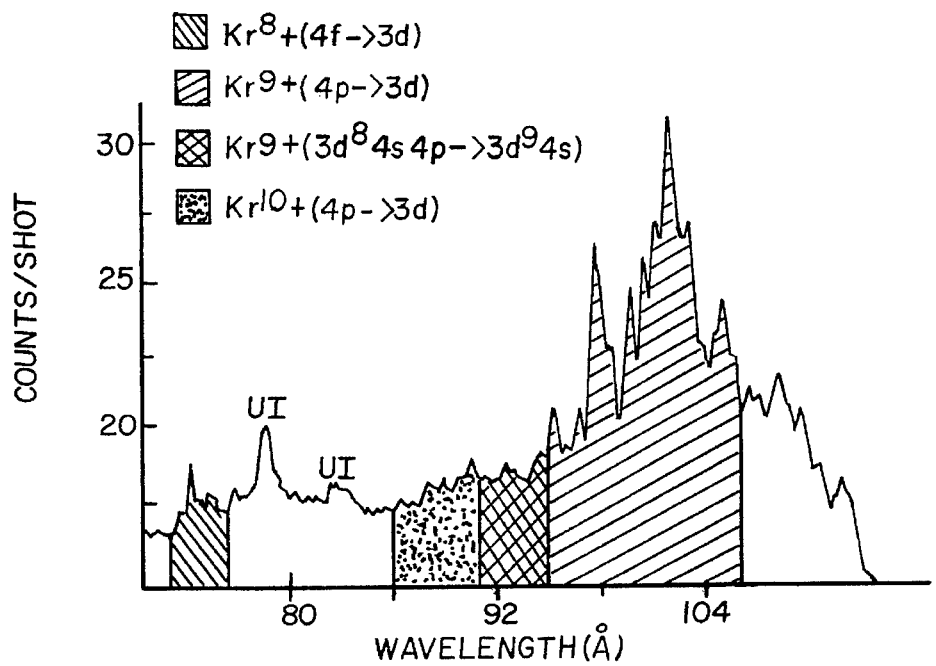
FIGS. 3A & 3B show a comparison of the observed spectra in the 72–112 Å region for krypton for two gas temperatures as monitored behind the nozzle, resulting from subpicosecond (about 300 fs) irradiation at 248 nm with a maximum intensity of between 0.5 and $1.0 \times 10^{17}$ W/cm$^2$.
Figure 3B:
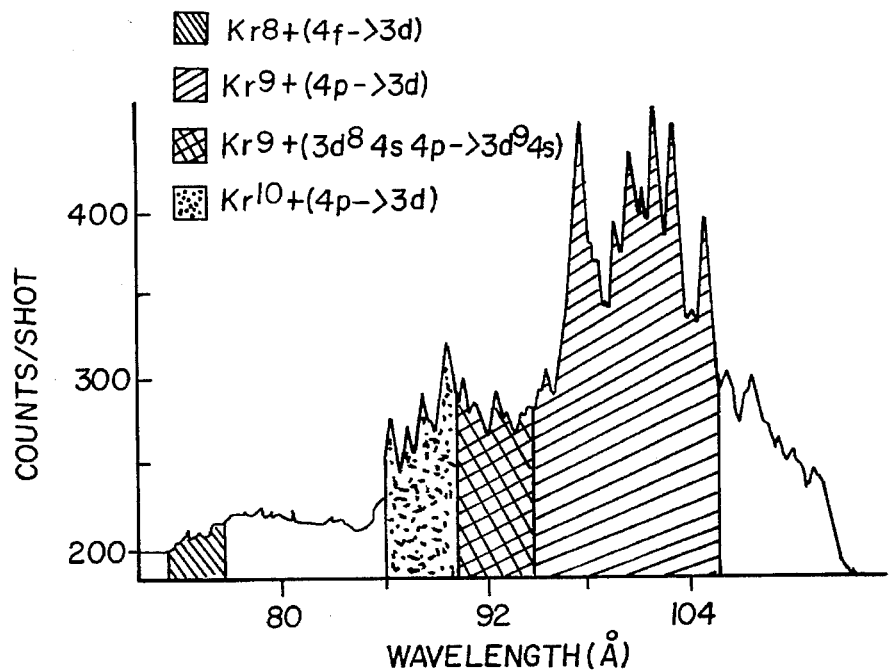

FIG. 3 shows a comparison of the observed spectra in the 72–112 Å region for krypton for two gas temperatures monitored behind the nozzle, resulting from subpicosecond (about 300 fs) irradiation at 248 nm with a maximum intensity of between 0.5 and 1.0×10$^{17}$ W/cm$^2$. The vertical scales in both spectra are absolute values, thereby providing a valid comparison of the signal strengths. The spectral resolution is 0.9±0.1 Å. FIG. 3a results from a nozzle temperature of 293 K and a stagnation pressure of 115 psia, while FIG. 3b derives from a nozzle temperature of 238 K and a stagnation pressure of 130 psia. UI designates unidentified spectra. The base line corresponds to about 17 counts/shot. The principal differences between the spectra are (1) the large increase in the Kr9+ (4p→3d) signal upon reduction of the temperature; (2) the appearance of a strong band at about 90 Å; and (3) the effective disappearance of the narrow features in the 72–83 Å region. The sharply increased signal strength and the appearance of new categories of transitions and higher charge states (as identified in the Figures from published spectroscopic data) would be anticipated from enhanced cluster formation according to the present invention. A higher cluster density of Kr$_n$ species for a fixed n should cause a corresponding increase in the emission, and the formation of larger clusters should lead to intensification of the emission and to new stages of ionization and classes of transitions (e.g., the band at 90 Å).

Additional evidence for the role of cluster formation in the generation of Kr9+ emission was found by observing the change in both the relative and absolute strengths of the Kr9+ (around 100 Å) and Kr8+ (around 116 Å) transitions as the stagnation pressure was increased from 65 to 165 psia at a fixed temperature of 293 K. Although the strength of the Kr8+ features did not change, a threefold intensification of the Kr9+ features was observed. Cluster formation should be augmented at higher stagnation pressures, and the Kr$^{8+}$ features, which are suspected to result from recombination processes in the plasma, should occur in a similar fashion at both stagnation pressures.

EXAMPLE 2

Returning to FIG. 1b, it is expected that by irradiation of krypton at intensities above 10$^{18}$ W/cm$^2$ should result in emission of prompt X-rays from L-shell transitions. Strong emission is observed in the 5–7.5 Å region which involves transitions from Krq$^+$ (q=24–27) for peak irradiation intensities of about 8×10$^{18}$ W/cm$^2$. Similarly, strong 5p→4d emission is observed at about 150 Å arising from Xe$^{9+}$ for irradiation intensities of about 4×10$^{15}$ W/cm$^2$, and at 9.5–16 Å for irradiation intensities of about 8×10$^{18}$ W/cm$^2$ arising from Xeq$^+$ (q=25–36).

EXAMPLE 3

Figure 4:
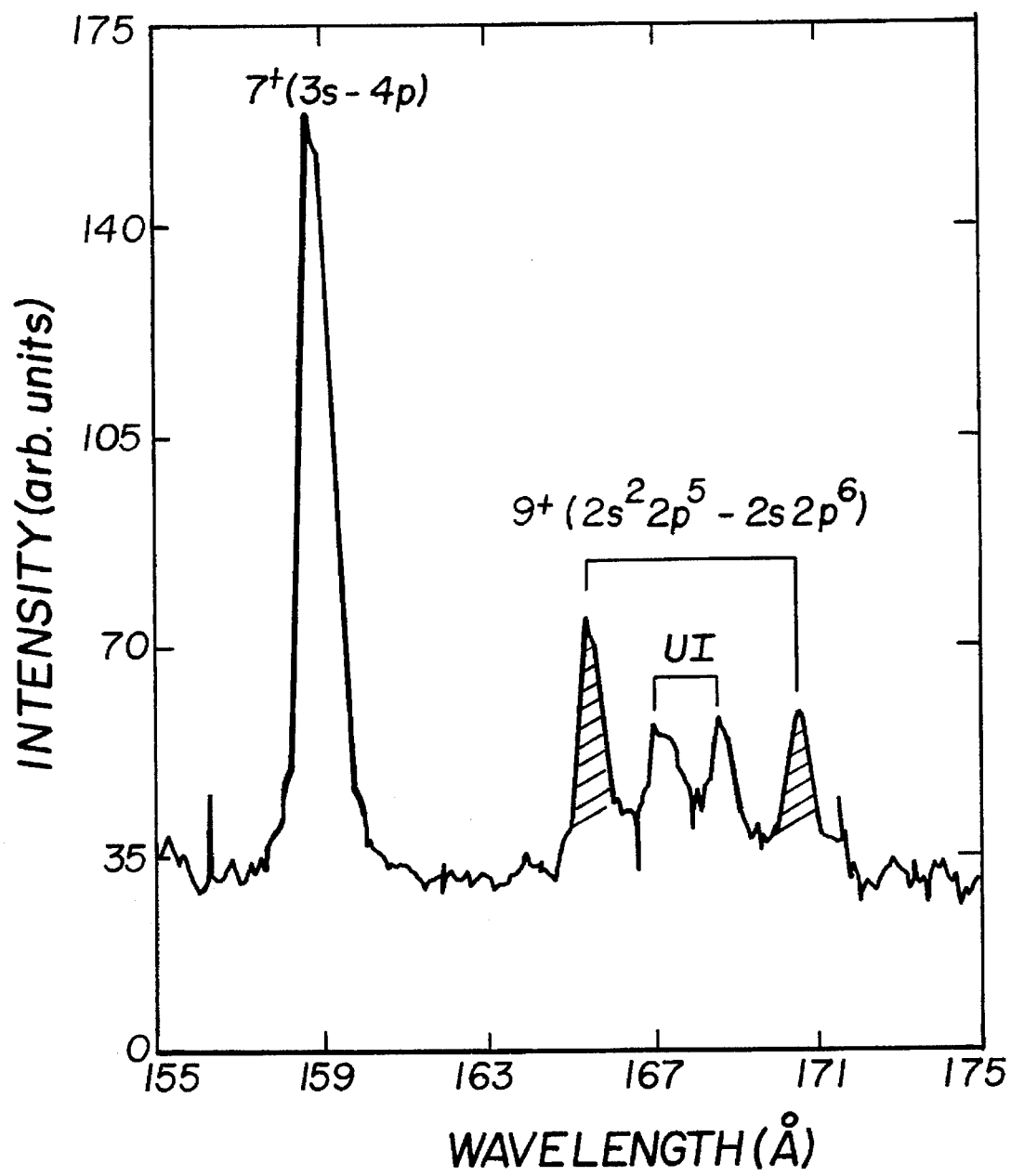
FIG. 4 shows the $Ar^{9+}$ $2s^22p^5 \rightarrow 2s2s2p^6$ doublet observed using a pulsed-gas jet argon source following irradiation at 248 nm at an intensity of about $5 \times 10^{16}$ W/cm$^2$, along with two unidentified (UI) features.
Figure 5:
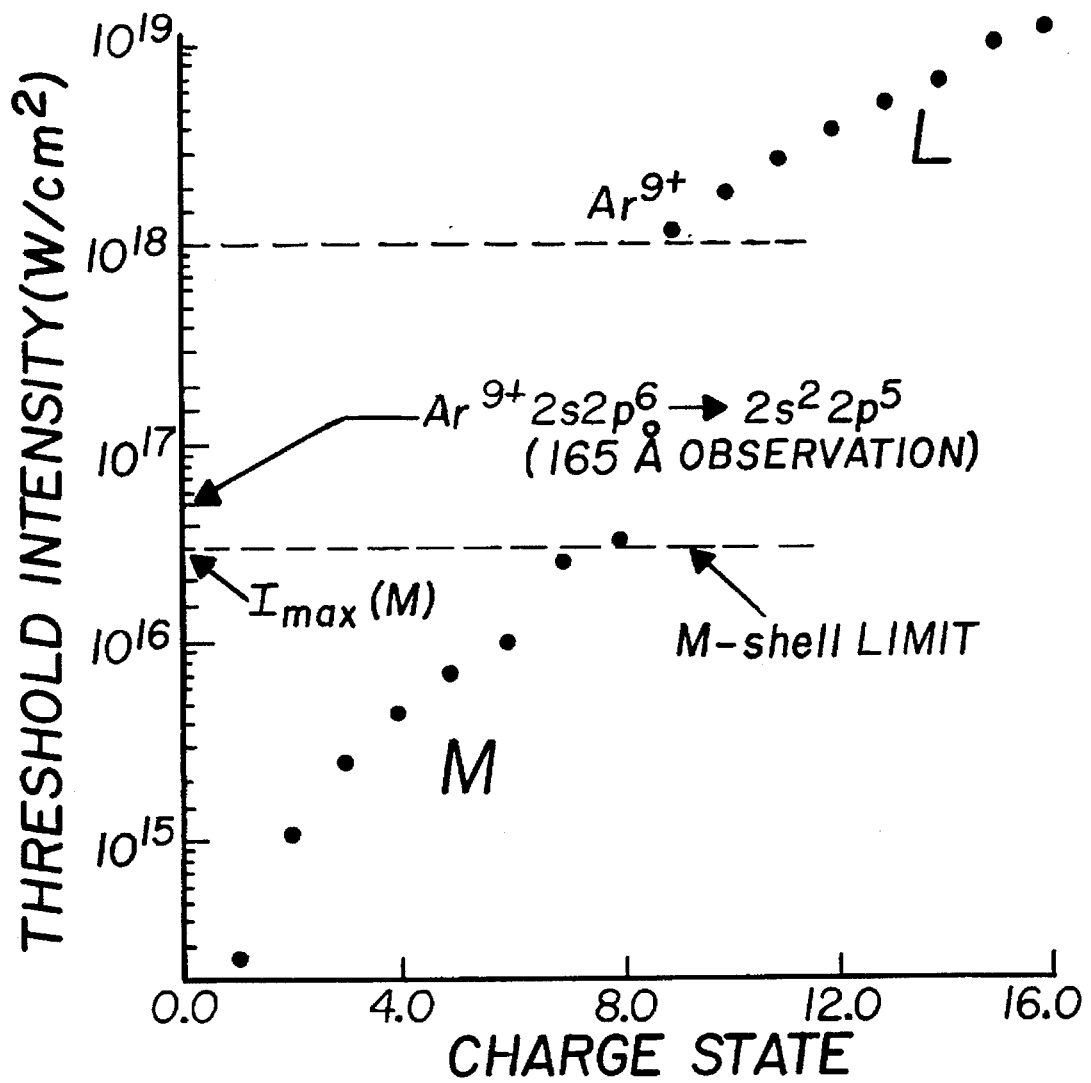
FIG. 5 shows the threshold intensity for ionization as a function of resulting charge state Z calculated for Ar for the L and M shells.
Figure 6:
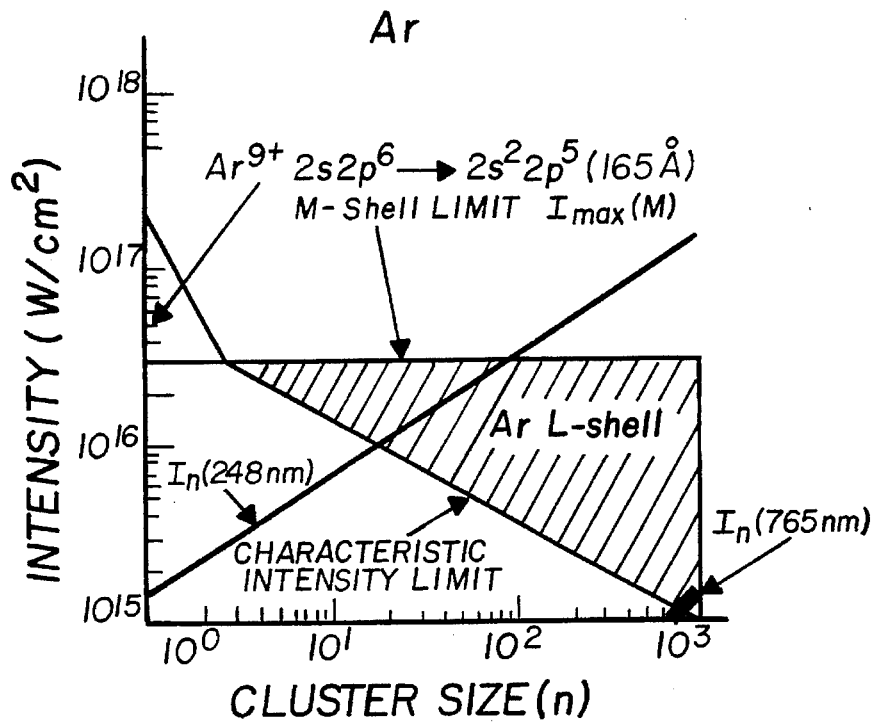
FIG. 6 illustrates the limiting conditions for the excitation of prompt Ar L-shell radiation from Ar clusters as a function of intensity of irradiation and cluster size. The allowed zone is cross-hatched.
Figure 7:
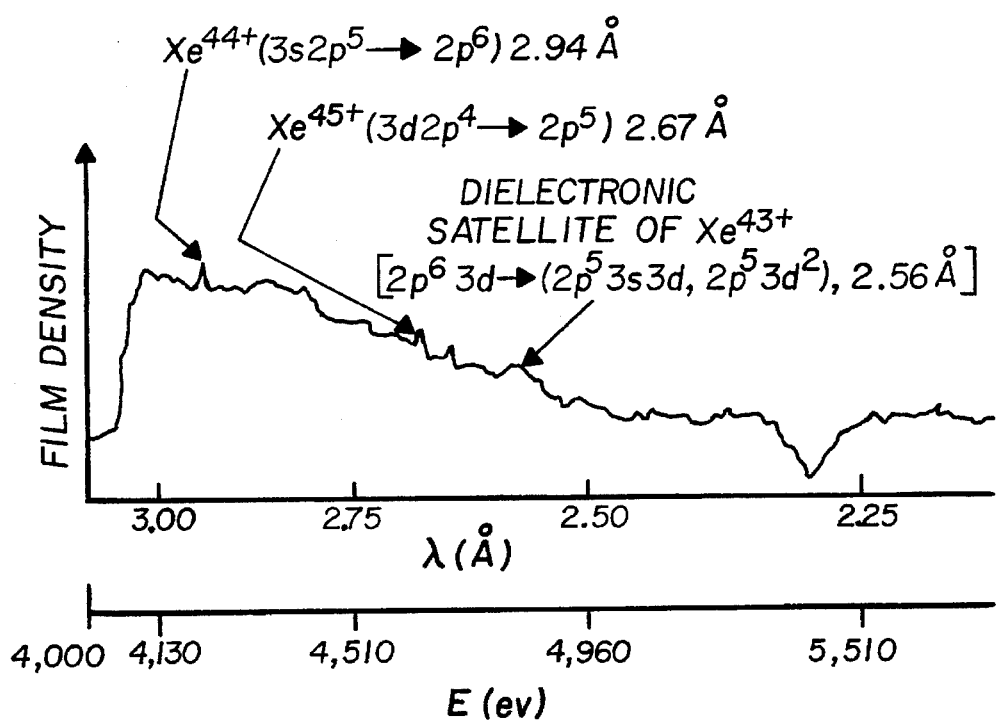
FIG. 7 shows the observed $Xe^{44+}](3s2p^5 \rightarrow 2p^6)$, 2.94 Å], $Xe^{45+}](3d2p^4 \rightarrow 2p^5)$, 2.67 Å] transitions, and a dielectronic satellite of $Xe^{43+}[(2p^63s3d, 2p^53d^2))$, 2.56 Å], from the multiphoton excitation of Xe clusters; the presence of the $Xe^{45+}$ with the excited state configuration $(3d2p^4)$ confirming the production of double vacancies by the multiphoton coupling.

Fluorescence from Ar emerging from a pulsed-gas jet source irradiated with a maximum intensity of about 5×10$^{16}$ W/cm$^2$ at 248 nm, shows the clear presence of emission at approximately 165 A on the well-known doublet 2s2p$^6$→2s$^2$2p$^5$ transition of Ar$^{9+}$. This finding, shown in FIG. 4 hereof, is yet another paradoxical result, since FIG. 5 hereof indicates that the threshold intensity for Ar$^{9+}$ production is about 10$^{18}$ W/cm$^2$, approximately 20-fold higher than that used in the experiment. Furthermore, spectroscopic analysis of the plasma leads to the conclusion that electron collisions could not have produced the Ar$^{9+}$ species from free atoms. However, as seen in FIG. 6 hereof, small cluster formation (n=2,3) would permit the excitation of an L-shell electron. Since the maximum experimental intensity is also above the M-shell limit, this interaction could readily generate the Ar$^{9+}$ species observed, and small cluster formation removes the anomaly of the Ar$^{9+}$ production and the observed radiation on the 165 Å doublet.

The implications for x-ray amplification can be derived from the inner-shell specificity of the excitation, which produces inverted population densities. Turning now in greater detail to FIGS. 5 and 6, which illustrate the present invention in the case of argon, if one irradiates a gaseous monatomic Ar sample at an intensity that is just below I$_{max}$(N), FIG. 5 illustrates that seven electrons are removed from the M-shell, producing Ar$^{7+}$ with the configuration 1s$^2$2s$^2$2p$^6$3s, but no Ar$^{8+}$ having the configuration 1s$^2$2s$^2$2p$^6$. However, as illustrated in FIG. 6, for (Ar)$_n$ clusters with n≥3 (n=1 indicating a free Ar atom), an L-shell electron can be additionally liberated at the same intensity I$_\tau$ with the outcome that Ar$^{8+}$ can be produced, but only with the excited configuration 1s$^2$2s$^2$2p$^5$3s. Furthermore, if n≥n$_c$=(r$_0$$^{2/Z}$σ$_{ei}$)$^3$, where Z is the resulting ionic charge, r$_0$ is the interatomic spacing of the atoms in a spherical group of n atoms, and σ$_{ei}$ is the cross section for the inelastic channel under consideration, every atom in the cluster is produced in the excited (Ar$^{S+}$)* state and ideally, no ground configuration Ar$^{8+}$ species are formed. Thus, the generation of the ground Ar$^{8+}$ state is totally blocked, while the channel leading to the excited level is fully open. In addition to the selective and efficient production of radiation from the 3s→2p transition of $Ar^{8+}$, which is observed experimentally, the dynamics automatically generate inverted population distributions with the capacity for amplification.

Intra-cluster collisional ionization of the M-shell can also destroy the inversion by enabling the generation of $Ar^{+8}$ $1s^22s^22p^6$ ground state species in this example. However, if one uses heavy atoms where $\sigma_{ei}$ is about $10^{-16}$ cm$^2$, such losses may be reduced, since estimates of the M-shell collisional ionization yield about $10^{-17}$ to $10^{-18}$ cm$^2$, and inner-shell excitation can still dominate. This conclusion is very conservative, however, since $\sigma_{ei}$ for Xe L-shell excitation is about $4\times10^{-21}$ cm$^2$, and copious inner=shell excitation has recently been observed (See, e.g., Example 4 hereof). Auger processes can also generate losses. However, for short pulse excitation (about 100 fs), Ar ions with certain configurations have reduced Auger rates, and with proper selection of the system undergoing irradiation at an appropriate intensity, the loss channels may be 10% of the total excitation.

Therefore, one predicts significant amplification. If it is assumed that the amplifying X-ray transition is Doppler broadened because of the ionic velocity arising from the coulomb explosion, one ignores the collisional and Auger loss channels, and one assumes the cluster size is $n = n_c$, it can be shown that the gain constant $g\lambda$ per unit electron density, $n_e$ at wavelength $\lambda_x$ is given by $$g\lambda/n_e = (\lambda_x^3/8\pi Z\sqrt{2})(A\lambda/c)(\sigma_{ei}/r_0^2)(Mc^2a_0/e^2) \times (r_0/a_0)^{1/2}$$

cm$^2$ for homonuclear clusters of atoms with mass M having an X-ray spontaneous emission rate $A_{80}$. Note that c is the speed of light and $a_0$ is the Bohr radius. The Table presents the estimated quantities for a selected group of materials. It may be observed that very favorable amplifications (For Ar, $g_\lambda \sim 10^2$ cm$^{-1}$.) may be achievable for electron densities $n_e < 10^{18}$ cm$^{-3}$ at wavelengths as short as $\lambda_x \sim 30$ Å with the use of subpicosecond excitation. The combination of very high gain and prompt emission permits lasing without mirrors since the stimulated emission pulse moves in step with the pump pulse and is amplified until it reaches a saturation intensity, after which all of the energy accumulated in the population inversion is extracted. This produces a laser beam moving with and in the same direction as the pump pulse.

EXAMPLE 4

As yet another example of the direct multiphoton production of hollow atoms, recent studies of the emission between 2 and 3 Å from Xe have demonstrated the direct production of species having multiple L-shell vacancies (e.g., $Xe^{45+}$ ($3d2p^4$)). Such states involve an energy transfer to the neutral atom exceeding 70 keV, and clearly illustrate that if the cross sections are favorable, and sufficient energy is applied to a molecular cluster, the electric field effectively "reaches into" the atoms and pulls out inner shell electrons, while leaving some of the outer electrons in place. That is, in Xe, there appears to be a preference for inner shell (n=2) excitation, while a significant number of outer-shell electrons (n≧3) remain bound to the atom. Molecular clusters of Xe were obtained from the pulsed gas jet described hereinabove where the gas behind the nozzle was maintained at a pressure of 90 psi at −40 C. Excitation was provided by a laser generating 248 nm radiation, as described hereinabove, with a pulse length of about 300 fs, and a peak power of about 0.7 TW, producing about $8\times10^{18}$ W/cm$^2$. Spectra from the radiating zone were recorded in the 2–3 Å region using a "pinhole" camera having a spatial resolution of approximately 100 μm, and with a von Hamos curved crystal spectrometer. Signal levels were such that single-shot exposures could readily be obtained. FIG. 6 shows the observed $Xe^{44+}[(3s2p^5\rightarrow2p^6)$, 2.94 Å], $Xe^{45+}[(3d2p^4\rightarrow2p^5)$, 2.67 Å] transitions, and a dielectronic satellite of $Xe^{43+}[(2p^63d\rightarrow(2p^53s3d, 2p^53d^2))$, 2.56 Å]. The presence of $Xe^{45+}$ with the excited configuration ($3d2p^4$) confirms the production of double vacancies by the multiphoton coupling to Xe clusters. Furthermore, the generation of the $Xe^{45+}$ ($3d2p^4$) state from the neutral atom requires an energy transfer exceeding 70 keV.

The foregoing description of two preferred embodiments of the invention has been presented for purposes of illustration and description. It is not intended to be exhaustive or to limit the invention to the precise form disclosed, and obviously many modifications and variations are possible in light of the above teaching. For example, since available information indicates that heavy atoms are strongly favored for X-ray amplification, it would be apparent to one having ordinary skill in the art of lasers, after studying the present disclosure, that clusters containing molecular species, and giant molecules, especially those involving atoms such as Au, Bi, Pb, Th, I, and U, rare earths and transition metals, would be suitable for generation of prompt X-radiation according to the teachings of the present invention. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What we claim is:

1. A method for generating prompt X-radiation, said method comprising the steps of:
   a. generating pulsed laser radiation having a chosen intensity and wavelength;
   b. generating gaseous atomic clusters having a chosen density and size; and
   c. directing the laser radiation into the gas clusters, whereby multiphoton coupling with the clusters occurs producing rapid atomic excitation, thereby removing selected inner-shell atomic electrons without removing all of the electrons in the next outermost shell.

2. The method as described in claim 1, wherein the cluster size is chosen to minimize the laser intensity required to excite substantially all the atoms in the cluster.

3. The method as described in claim 1, wherein the pulse width of the laser radiation is chosen such that atomic excitation occurs on a timescale which is short compared with recombination processes in the atomic plasma produced.

4. The method as described in claim 3, wherein the pulse width is less than one picosecond.

5. The method as described in claim 1, wherein the intensity and wavelength of the laser radiation, and the atomic species in the clusters are chosen according to the wavelength desired for the generated X-rays.

6. The method as described in claim 5, wherein the laser radiation has a power level greater than 1 TW per pulse.

7. The method as described in claim 6, wherein the atoms in the atomic clusters are heavy atoms.

8. The method as described in claim 7, wherein the atoms in the atomic clusters are chosen from the group consisting of Ar, Kr, Xe, Au, Bi, Th, Pb, U, and mixtures thereof.

9. The method as described in claim 1 wherein the atomic clusters contain atoms bound in molecules.

10. The method as described in claim 9, wherein the molecules are chosen from the group consisting of $N_2$, $I_2$, and $UF_6$.

11. A method for generating laser radiation in the X-ray region of the electromagnetic spectrum, said method comprising the steps of:
   a. generating pulsed laser radiation having a chosen intensity and wavelength;
   b. generating gaseous atomic clusters having a chosen density and size; and
   c. directing the laser radiation into the gas clusters, whereby multiphoton coupling with the clusters occurs producing rapid atomic excitation, thereby removing selected inner-shell atomic electrons without removing all of the electrons in the next outermost shell with the consequent generation of a population inversion.

12. The method as described in claim 11, wherein the cluster size is chosen to minimize the laser intensity required to excite substantially all the atoms in the cluster.

13. The method as described in claim 11, wherein the pulse width of the laser radiation is chosen such that atomic excitation occurs on a timescale which is short compared with recombination processes in the atomic plasma produced.

14. The method as described in claim 13, wherein the pulse width is less than one picosecond.

15. The method as described in claim 11, wherein the intensity and wavelength of the laser radiation, and the atomic species in the clusters are chosen according to the wavelength desired for the generated X-rays.

16. The method as described in claim 15, wherein the laser radiation has a power level greater than 1 TW per pulse.

17. The method as described in claim 16, wherein the atoms in the atomic clusters are heavy atoms.

18. The method as described in claim 17, wherein the atoms in the atomic clusters are chosen from the group consisting of Ar, Kr, Xe, Au, Bi, Th, Pb, U, and mixtures thereof.

19. The method as described in claim 11 wherein the atomic clusters contain atoms bound in molecules.

20. The method as described in claim 19, wherein the molecules are chosen from the group consisting of $N_2$, $I_2$, and $UF_6$.

21. An apparatus for generating prompt X-radiation, said apparatus comprising in combination:
   a. means for generating pulsed laser radiation having a chosen intensity and wavelength;
   b. means for generating gaseous atomic clusters having a chosen density and size; and
   c. means for directing the laser radiation into the gas clusters, whereby multiphoton coupling with the clusters occurs producing rapid atomic excitation, thereby removing selected inner-shell atomic electrons without removing all of the electrons in the next outermost shell.

22. An apparatus for generating laser radiation in the X-ray region of the electromagnetic spectrum, said apparatus comprising in combination:
   a. means for generating pulsed laser radiation having a chosen intensity and wavelength;
   b. means for generating gaseous atomic clusters having a chosen density and size; and
   c. means for directing the laser radiation into the gas clusters, whereby multiphoton coupling with the clusters occurs producing rapid atomic excitation, thereby removing selected inner-shell atomic electrons without removing all of the electrons in the next outermost shell with the consequent generation of a population inversion.

* * * * *

UNITED STATES PATENT AND TRADEMARK OFFICE
CERTIFICATE OF CORRECTION

PATENT NO.    : 5,487,078
DATED         : January 23, 1996
INVENTOR(S)   : Charles K. Rhodes et al.

It is certified that error appears in the above-identified patent and that said Letters Patent is hereby corrected as shown below:

<u>Column 1</u>,
Line 4, insert above "FIELD OF INVENTION"
-- STATEMENT REGARDING FEDERAL RIGHTS This invention was made with government supprt under grant number DE-FG02-9134 121-9 awarded by the Department of Energy. The government has certain rights in the invention. --.

Signed and Sealed this

Twenty-fifth Day of April, 2006

JON W. DUDAS
*Director of the United States Patent and Trademark Office*